Oct. 5, 1937.   W. C. HIERING   2,094,984

METHOD OF ATTACHING SMALL BEARINGS TO METAL PLATES

Filed May 15, 1935

INVENTOR
William C. Hiering
BY Frdk C Fischer
ATTORNEY

Patented Oct. 5, 1937

2,094,984

UNITED STATES PATENT OFFICE 2,094,984

METHOD OF ATTACHING SMALL BEARINGS TO METAL PLATES

William C. Hiering, Newark, N. J., assignor to The J. E. Mergott Company, Newark, N. J., a corporation of Delaware Application May 15, 1935, Serial No. 21,545

2 Claims. (Cl. 29—148)

This invention relates to a method of attaching small bearings and the like to metal plates, so as to prevent loosening or detaching of said bearings during use.

In ladies' hand bags, for example, the frame members thereof are usually held together by means of a spring controlled latch. The spring of such a latch generally comprises a strip of resilient wire which passes through one or more small bearings which are attached to a plate or flange of the metal frame member used in the hand bag. Such bearings, are generally formed by bending a strip of metal back upon itself to provide a tubular portion to receive the wire spring, the bearing being also provided with abutting flanges which heretofore have been inserted through apertures in the plate and then bent over upon the plate. Such a structure has been objectionable as it has been found that after a certain amount of use the parts become loosened and in many instances the bearing becomes completely detached from the plate.

It is, therefore, an object of this invention, to provide a method of attaching small bearings and the like to plates in a manner which will positively prevent them from being loosened or detached while being used in the ordinary manner.

A further object is the provision of a method which considerably facilitates the attaching of small bearings and the like to plates; at the same time providing a positive connection between the plate and the bearings.

Figure 1:
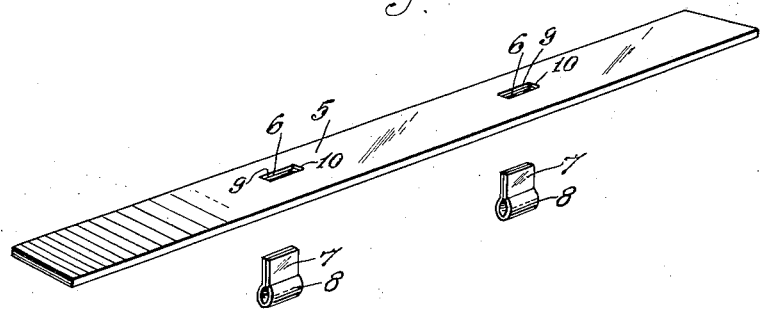
Figure 2:
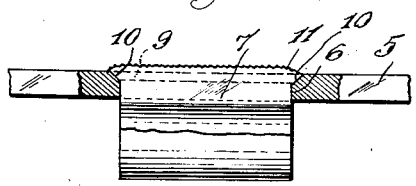
Figure 3:
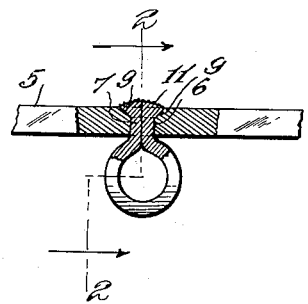
Figure 4:
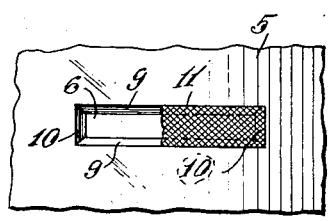

These and other advantageous objects, which will later appear, are accomplished by the simple and practical construction and arrangement of parts hereinafter described and exhibited in the accompanying drawing, forming part hereof, and in which:

Fig. 1 is a perspective view, exploded, showing a plate and a pair of small bearings to be attached thereto, Fig. 2 is a sectional view taken on line 2—2 of Fig. 3, Fig. 3 is a sectional view showing a small bearing attached to a plate in accordance with my invention, and Fig. 4 is a plan view of an aperture in a plate partially filled by a portion of a bearing attached to the plate in accordance with my invention.

Referring to the drawing, there is shown, for example, in Fig. 1, a plate 5 having apertures 6 therein to receive the abutting flanges 7, integral with small bearings 8.

The small bearings 8 are formed by bending a sheet of metal back upon itself to provide a tubular portion, and then pressing the abutting flanges 7 towards each other. The formation of the small bearings 8 and their abutting flanges is common and well known in the art. The upper portion of the plate bordering apertures 6 is bevelled at 9 and 10, (see Fig. 4) said apertures being substantially rectangular in shape.

In attaching a bearing to the plate, the abutting flanges 7 are passed upwardly through the plate until the tubular portion 8 or bearing substantially abuts the under side of the plate. The abutting flanges project through the apertures, and the portion of said flanges above the plate 5 are pressed outwardly by means of a milled tool so that the upset metal of flanges 7 covers the bevelled portions 9 and 10 surrounding the apertures 6. In this manner there is provided a head 11 for the bearing 8 which is prevented from being drawn through the apertures 6 due to its engagement with the bevelled portions of the plate which surround said apertures. By using a milled tool which has a serrated face, the metal of the abutting flanges is easily broken and distorted so that it is properly spread for the purpose of forming the head 11, which is clearly shown in Figs. 2 and 3.

From the above description, it will be seen that I have provided a simple and inexpensive expedient for attaching small bearings to metal plates so that the bearings will not become loosened or detached by use.

While my invention is especially adapted for use in connection with latches for ladies' hand bag frames, it should be noted that it is equally applicable in other situations where it is necessary to use small tubular bearings for holding resilient wires or small shafts.

The foregoing disclosure is to be regarded as descriptive and illustrative only and not as restructive or limitative of the invention, of which obviously an embodiment may be constructed including many modifications without departing from the spirit and scope of the invention as denoted in the appended claims.

Having thus described my invention, what I claim as new and desire to secure by Letters Patent, is:

1. The method of attaching a small tubular bearing member with abutting flanges to a metal plate forming a part of a hand bag frame, comprising forming an aperture in said plate, bevelling the portions of the plate surrounding the aperture, passing said flanges through the aperture in the plate, and upsetting and spreading said flanges by means of a milled tool to completely fill the aperture and cover the bevelled portions of the plate.

2. The method of attaching a small tubular bearing member with abutting flanges to a metal plate forming a part of a hand bag frame, comprising forming an aperture in said plate, bevelling the portions of the plate surrounding the aperture, passing said flanges through the aperture in the plate, and upsetting and spreading said flanges to completely fill the aperture and cover the bevelled portions of the plate.

WILLIAM C. HIERING.